United States Patent [19]
DuPont

[11] Patent Number: 5,232,682
[45] Date of Patent: Aug. 3, 1993

[54] PROCESS AND INSTALLATION FOR PRODUCING A GAS CONTAINING HYDROGEN FROM METHANOL

[75] Inventor: René DuPont, Nogent-sur-Marne, France

[73] Assignee: L'Air Liquide, Societe Anonyme Pour L'Etude et L'Exploitation des Procedes Georges Claude, Paris, France

[21] Appl. No.: 694,688

[22] Filed: May 2, 1991

[30] Foreign Application Priority Data

May 9, 1990 [FR] France ............... 90 05780

[51] Int. Cl.$^5$ .................. C01B 3/02; C22B 26/10
[52] U.S. Cl. .................. 423/648.1; 165/156; 422/201; 422/203; 422/204
[58] Field of Search .............. 423/648.1; 422/201, 422/203, 204; 165/156

[56] References Cited

U.S. PATENT DOCUMENTS

| | | | |
|---|---|---|---|
| 2,644,744 | 7/1953 | Hartwig et al. | 422/202 |
| 3,409,074 | 11/1968 | Wagner et al. | 422/201 |
| 3,490,878 | 1/1970 | Russell | 422/203 |
| 3,635,682 | 1/1972 | Vine et al. | 422/204 |
| 3,671,198 | 6/1972 | Wallace | 422/204 |
| 4,194,966 | 3/1980 | Edison et al. | 422/204 |
| 4,495,154 | 1/1985 | Christner et al. | 422/204 |
| 4,946,667 | 8/1990 | Beshty | 423/648.1 |
| 4,999,089 | 3/1991 | Nakase et al. | 422/204 |

FOREIGN PATENT DOCUMENTS 0186527 7/1986 European Pat. Off. .
0247384 12/1987 European Pat. Off. .
2213496 8/1989 United Kingdom .

OTHER PUBLICATIONS

"Reforming Device for Methanol", *Patent Abstracts of Japan*, vol. 10, No. 120, (C-343) (2177) of May 6, 1986.
"Methanol Reformer", *Patent Abstracts of Japan*, vol. 13, No. 149 (C-637) (3767) of Sep. 18, 1989.

*Primary Examiner*—Wayne Langel
*Attorney, Agent, or Firm*—Young & Thompson

[57] ABSTRACT

The invention pertains to an installation comprising a reforming reactor (12) supplied with a vaporized and superheated methanol-water mixture, a device for heating the liquid methanol-water mixture by heat exchange (5) with the reformed gaseous mixture (56), a device for vaporizing and superheating the heated mixture by heat exchange (23) with a heat-carrying fluid (51), a device for effecting the reaction of the vaporized methanol-water mixture by heat exchange (28-29) also with the heat-carrying fluid (31-32), a separator (75) for separating the water from the reformed mixture by cooling and partial condensation (61-63-64), and a device for producing pure hydrogen which also produces residual combustibles, and a device (15) for heating the heat-carrying fluid (31-32) by combustion (15), in particular of the residual combustibles. The heat exchangers and the device for heating the heat-carrying fluid are all comprised by double coaxial tubing coil-type exchangers disposed about the inner cylindrical periphery of a same housing which forms both a combustion chamber (12) and a reforming reactor (28-31) (29-32).

9 Claims, 2 Drawing Sheets

5,232,682

PROCESS AND INSTALLATION FOR PRODUCING A GAS CONTAINING HYDROGEN FROM METHANOL

BACKGROUND OF THE INVENTION

1. Field of the Invention

The present invention relates to the production of a gaseous mixture containing hydrogen from methanol, of the type wherein a stream of a mixture of methanol and water is heated by heat exchange with the gas produced by reforming, then vaporized and superheated by heat exchange with a heat-carrying fluid heated itself by the combustion of a combustible gas which is typically a mixture of residual gases emitted by a downstream gas separation unit which produces pure hydrogen from the gaseous mixture produced.

2. Description of the Prior Art

The implementation of such a production process classically requires the intervention on the one hand of a reforming reactor and on the other hand of a boiler for the combustion of the residuals, with a heat-carrying fluid system which extends form one to the other with a heat receiving exchanger in the combustion boiler and other heat emitting exchangers at the reforming reactor. This procedure results in installations which are relatively heavy but appropriate for important production rates. However, when the production rate is relatively small, the implementation mentioned hereinabove leads to important investment costs which have an effect on the cost of the hydrogen produced.

SUMMARY OF THE INVENTION

The present invention relates to a process and an installation for producing hydrogen from methanol, which allows for an important simplification of the apparatus and which is particularly adapted to the production of moderate hydrogen rates. Of the order of 50 to 300 $Nm^3/h$.

In accordance with the present invention, in a process of the type mentioned hereinbefore, the various heat exchanges all take place at the periphery of a housing which forms both a reforming reactor and a combustion chamber, the heat exchanges for heating, vaporizing, superheating and for effecting the reaction of the methanol-water mixture being accomplished by way of coil-type exchangers with double coaxial tubings, the hottest fluid flowing through the intertubular space of each exchanger.

By achieving all of the heat exchange, combustion and reforming reaction operations in a same and sole housing, it will be understood that on the one hand the implementation investment is reduced to a bare minimum and, on the other hand, that heat losses at the level of the heat-carrying fluid are also reduced to a strict minimum.

Preferably, the double tubing coil for the reaction of the vaporized methanol-water mixture which has the heat-carrying fluid disposed externally is positioned in the housing so as to be directly exposed to the combustion flame of the combustible gas, whereas the double tubing coil for the vaporization and superheating of the methanol-water mixture which is in heat exchange with the external heat-carrying fluid is positioned in the housing between the above reaction coil of the methanol-water mixture and the heating coil of the liquid methanol-water mixture which is in heat exchange with the production gas, in such a way as to form a passage with baffles for the discharge of the fumes.

The present invention pertains also to an installation for producing a gaseous mixture containing hydrogen from methanol, comprising a reforming reactor fed with a liquid methanol-water mixture, means for heating the liquid methanol-water mixture by heat exchange with the hot production gas mixture, means for vaporizing and superheating the heated mixture by heat exchange with a heat-carrying fluid, means for effecting the reaction of the vaporized and superheated methanol-water mixture by heat exchange also with the heat-carrying fluid, means for separating the water from the reformed mixture by cooling and partial condensation, and means for producing pure hydrogen by gaseous separation which releases the residual combustibles, means for heating the heat-carrying fluid by combustion, in particular of the residual combustibles, and this installation in accordance with the invention is characterized in that the heat exchange means and the means for heating the heat-carrying fluid are all located on the periphery of a same housing forming both a combustion chamber for the residuals and a reforming reactor. Preferably, the means for heating the liquid methanol-water mixture, the means for vaporizing and superheating the methanol-water mixture and the means for effecting the reaction of the vaporized and superheated methanol-water mixture form three cylindrical exchanger units of the double tubing coil type, positioned concentrically relative to one another, the innermost exchanger defining the effective combustion chamber with its burner.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
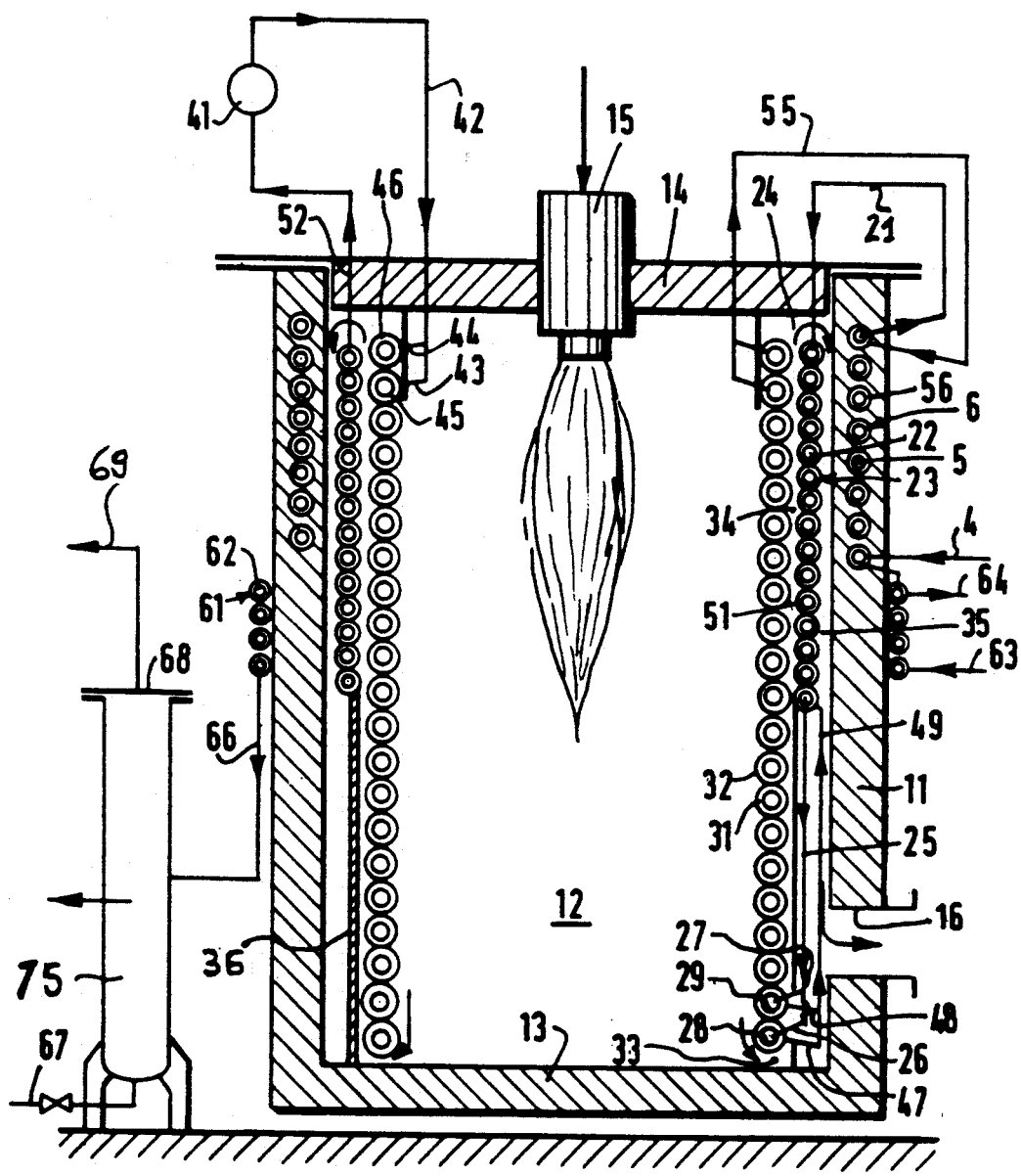
FIG. 1 is a cross-sectional view of a combustion boiler forming a reforming reactor.
Figure 2:
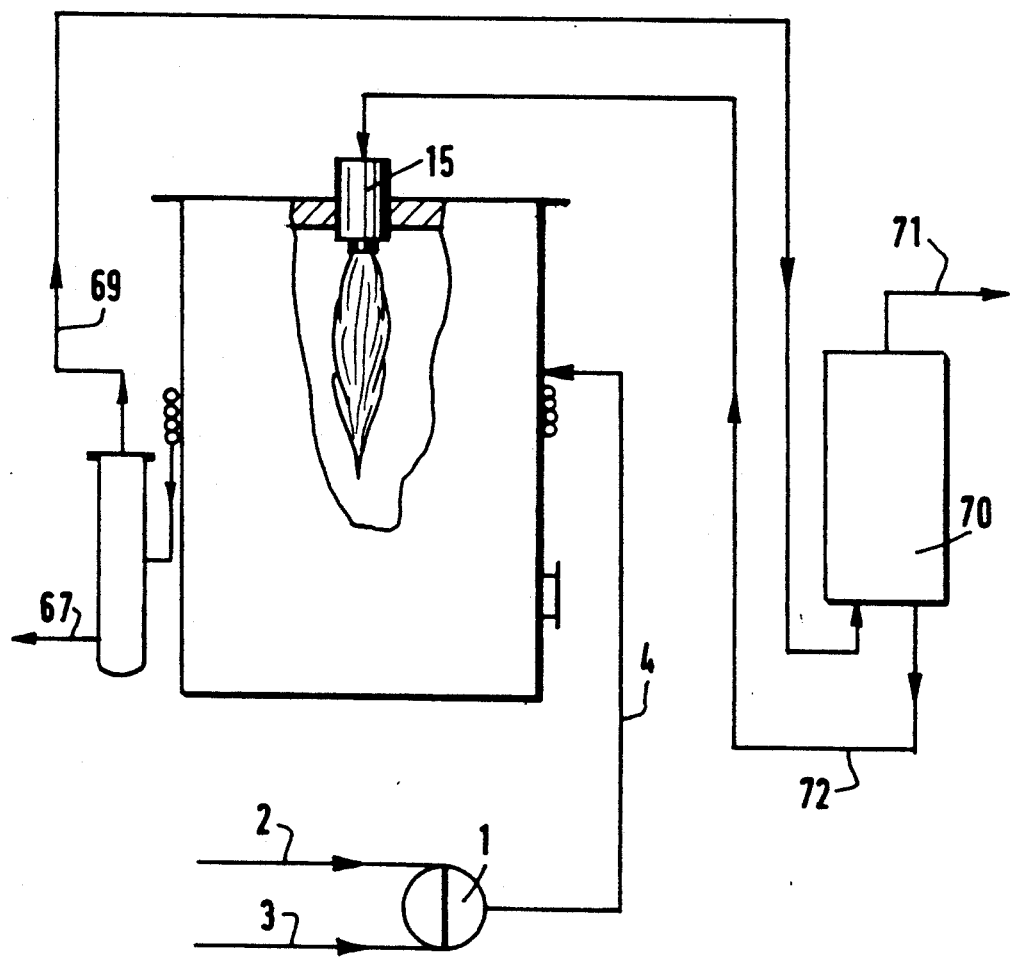
FIG. 2 is a more complete view of the invention.

With reference to the annexed drawings, a mixer 1 receives methanol through a pipe 2 and water through a pipe 3 and transfers the methanol-water mixture in a liquid state through a pipe 4 into an internal coil 5 of a double coil tubular exchanger 6. This exchanger having the shape of a coil 5 is positioned in the thermally insulated lateral cylindrical wall 11 of a combustion chamber 12 having also a bottom wall 13 and a top wall 14 provided with a burner 15. At the exit of the tubular coil 5, the methanol-water mixture which is still in a liquid state but which is heated is transferred through a conduit 21 into an internal conduit 22 of another heat exchanger 23 having the form of a double tubing coil, in which the methanol-water mixture is vaporized and superheated. This heat exchanger 23 is positioned at a small distance from the lateral wall 11 of the combustion chamber 12 while defining with respect thereto an annular space 35 and at its upper extremity a passage 24 with the top wall 14, and proceeds downwards with a ferrule 36 which extends to the bottom wall 13. It is also possible that the ferrule 36 be at the upper position, and the coil 23 at the lower position.

The methanol-water vaporized and superheated mixture emerging from the internal tubular coil 22 is then transferred through a conduit 25 which is subdivided into two conduits 26 and 27 at the inlets of two reforming reaction tubular coils 28 and 29 of two double tubing exchangers imbricated into one another 31, 32, which extend substantially along the entire height of the combustion chamber 12 at a small distance (annular space 34) from the heat exchanger 23 and at a small distance (lower space 33) from the bottom wall 13, in such a way as to define an annular passage with baffles 33-34-24-35 for the discharge of the fumes, which escape from the combustion chamber 12 through a large passage 16 located at the bottom of the combustion chamber 12. A heat-carrying fluid system includes a pump 41 with a delivery pipe 42 which subdivides into two conduits 43 and 44 which extend into the intertubular space 45-46 of the heat exchangers 31-32, from which they emerge at 47-48 near the bottom wall 13 of the combustion chamber 12 so as to be recirculated through a conduit 49 into the intertubular space 51 of the vaporization and superheating tubular exchanger 23, whence the heat-carrying fluid exits through a conduit 52 towards the suction of the circulation pump 41.

The production gas which is a mixture of hydrogen and water escapes from the reforming exchangers 28-29 through a conduit 55 in order to be introduced into the intertubular space 56 of the exchanger 5 for heating the liquid methanol-water mixture, after which this production gas is cooled in a cooling tubular exchanger 61 by flowing in an internal tube 62 while cooling water flows through the intertubular space of this exchanger 61, the cooling water being introduced therein by a conduit 63 and evacuated therefrom through a conduit 64. The cooled reformed mixture is then transferred through a conduit 66 to a separator pot or tank 75 which delivers at its bottom water 67 and at its head a mixture of impure hydrogen 68 which is transferred through a conduit 69 to a separation unit 70, generally of the adsorption type ("Pressure swing adsorption PSA"), which delivers pure hydrogen gas through a conduit 71 and various residual combustibles through a conduit 72 which feed the burner 15.

It will be realized that the above construction in which the combustion chamber also forms the reforming reactor is particularly simple because the heat exchange circuits of the reformed mixture on the one hand, and of the heat-carrying fluid on the other hand with the methanol-water mixture are all integrated therein, with exception of the heat-carrying fluid circulation pump which is located in the immediate proximity thereto. The result is a substantial reduction in the investment cost. As all of the thermal exchanges are done in situ, with the hottest fluid directly exposed to the combustion flame and in immediate heat exchange with the mixture being reformed, there is ensured an optimal thermal efficiency of the heat exchanges, so that the cost for operating the installation is also reduced.

I claim:

1. In a process for the production of a gaseous mixture containing hydrogen from methanol, comprising subjecting a mixture of methanol and water to heating by heat exchange with the gaseous mixture produced, then subjecting said mixture of methanol and water to vaporization, superheating, and reaction by heat exchange with a heat-carrying fluid which is itself heated by combustion of a combustible gas; the improvement comprising conducting said heating and vaporization and superheating and reaction in double coaxial tubing coil-type exchangers disposed about an inner periphery of a housing, and conducting said combustion within said housing by producing a flame within said housing, said coil-type exchangers surrounding said flame.

2. A process as claimed in claim 1, and disposing said double coaxial tubing coil-type exchangers in coaxial cylindrical inner and outer layers, and conducting said reaction in said inner layer and said heating and vaporization and superheating in said outer layer.

3. A process as claimed in claim 1, and cooling and delivering the said produced gaseous mixture to a separation unit for the separation of hydrogen and a residual gaseous mixture, and burning said residual gaseous mixture to produce said flame.

4. A process as claimed in claim 1, wherein the double coaxial tubing coil-type exchanger used in the heat exchange reaction with the heat-carrying fluid is directly exposed to said flame.

5. A process as claimed in claim 1, wherein each coaxial tubing coil-type exchanger defines a central space and an intertubular space, and fluid flowing through said intertubular space is hotter then fluid flowing in said central space.

6. In apparatus for producing a gaseous production mixture containing hydrogen from methanol, comprising a reforming reactor, means to supply the reforming reactor with a liquid methanol-water mixture, means for heating the liquid mixture by heat exchange with the gaseous production mixture, means for vaporizing and superheating the heated liquid mixture by that exchange with a heat-carrying fluid, means for effecting the reaction of the vaporized methanol-water mixture by heat exchange with said heatcarrying fluid, and combustion means for heating the heatcarrying fluid; the improvement wherein said means for heating and vaporizing and superheating and effecting the reaction comprise double coaxial tubing coil-type exchangers disposed about the inner periphery of said reactor, said combustion means including means for producing a flame which is surrounded by said double coaxial tubing coil-type exchangers.

7. Apparatus as claimed in claim 6, wherein said double coaxial tubing coil-type exchangers are disposed in plural coaxial superposed layers whereby the reaction takes place in the innermost said layer.

8. Apparatus as claimed in claim 6, further comprising means for cooling and partially condensing the gaseous production mixture thereby to separate water from the gaseous production mixture.

9. Apparatus as claimed in claim 6, further comprising means for separating hydrogen from said gaseous production mixture thereby to leave a residual gaseous mixture, and means for feeding said residual gaseous mixture as combustion gas to said combustion means.

* * * * *